United States Patent [19]
Sakakibara et al.

[11] Patent Number: 5,461,478
[45] Date of Patent: Oct. 24, 1995

[54] METHOD AND APPARATUS FOR MEASURING THREE-DIMENSIONAL POSITION AND ORIENTATION OF AN OBJECT USING LIGHT PROJECTION

[75] Inventors: Shinsuke Sakakibara, Komae; Mitsuo Hiraizumi, Hachioji, both of Japan

[73] Assignee: Fanuc Ltd., Yamanashi, Japan

[21] Appl. No.: 108,589

[22] PCT Filed: Dec. 17, 1992

[86] PCT No.: PCT/JP92/01647

§ 371 Date: Aug. 24, 1993

§ 102(e) Date: Aug. 24, 1993

[87] PCT Pub. No.: WO93/13383

PCT Pub. Date: Jul. 8, 1993

[30] Foreign Application Priority Data

Dec. 26, 1991 [JP] Japan ................... 3-356868
Mar. 26, 1992 [JP] Japan ................... 4-100340

[51] Int. Cl.$^6$ ................................... G01B 11/14
[52] U.S. Cl. ........................... 356/375; 356/376
[58] Field of Search ........................ 356/375, 376, 356/377

[56] References Cited

U.S. PATENT DOCUMENTS

| | | | |
|---|---|---|---|
| 5,004,929 | 4/1991 | Kakinoki et al. | 356/376 |
| 5,076,697 | 12/1991 | Takagi et al. | 356/376 |
| 5,307,153 | 4/1994 | Maruyama et al. | 356/376 |

FOREIGN PATENT DOCUMENTS

| | | |
|---|---|---|
| 62-272106 | 11/1987 | Japan . |
| 63-61108 | 3/1988 | Japan . |
| 63-109307 | 5/1988 | Japan . |
| 63-132146 | 6/1988 | Japan . |
| 63-222209 | 9/1988 | Japan . |
| 63-298105 | 12/1988 | Japan . |

*Primary Examiner*—Richard A. Rosenberger
*Assistant Examiner*—Robert Kim
*Attorney, Agent, or Firm*—Staas & Halsey

[57] ABSTRACT

A method and an apparatus capable of accurately measuring the three-dimensional position and orientation of an object in a short data processing time are provided, wherein a first slit light is projected from a first light projector for scanning an object, and each light image is obtained by a CCD camera. Similarly, a second slit light is projected from a second light projector for scanning the object and each light image is obtained by the CCD camera. The first and second slit lights are perpendicular to each other. The individual images obtained are processed to find a bent point and a disconnection point in each slit-light scan image. From among these points, a group of points which are reckoned to be lying on the same straight line is extracted, and the obtained straight line of points is used as edge information of the object. Based on the edge information and shape data of the object, three-dimensional position/orientation data is obtained. Any edge of the object can surely be detected with at least one of the slit lights, regardless of its direction, and thus, even if the scanning intervals of the slit lights are rough, edges of the object can surely be detected in a shorter measuring time is shortened.

21 Claims, 9 Drawing Sheets

METHOD AND APPARATUS FOR MEASURING THREE-DIMENSIONAL POSITION AND ORIENTATION OF AN OBJECT USING LIGHT PROJECTION

BACKGROUND OF THE INVENTION

1. Field of the Invention

The present invention relates to a method and an apparatus for measuring the three-dimensional position and orientation of an object, and more particularly, to a method and an apparatus permitting a short processing time and high-accuracy measurement, which are especially suited for use in industrial robots.

2. Description of Related Art

To cope with a situation in which it is not always possible to place a workpiece to be fed to an industrial robot in a predetermined position and orientation with respect to the robot, a visual sensor is generally used for measuring the position and orientation of workpieces to obtain position/orientation correction data. Particularly in the case where the position and orientation of a workpiece cannot be specified three-dimensionally, a three-dimensional visual sensor is used.

Three-dimensional visual sensors are generally classified into passive visual sensors called stereo vision and active visual sensors. The active visual sensors are further divided into a light radar type and a type using a light projecting method based on triangulation.

A passive stereo vision sensor uses two CCD cameras placed on its right and left, respectively, and a distance in the depth direction is measured through the triangulation technique, by using corresponding points in two images obtained by the cameras. However, if the images are more or less complicated, or if a major part shown in one image is hidden in the other image, it is difficult to find correspondence between the two images. Further, the passive sensor inherently has a disadvantage in that illuminating conditions greatly affect the measurement quality.

On the other hand, the active light radar method uses a laser beam spot as in a radar, wherein the laser beam is subjected to amplitude modulation, and a distance in the depth direction is measured based on the phase difference between the outgoing light and the reflected light. The laser beam scans two-dimensionally with the aid of two movable mirrors to obtain a range image. The range image is an image in which the values of pixels forming the image individually represent the distance to an object in the depth direction. Sensors of this type developed until now, however, are mainly for outdoor use, have a measurement limit of as large as over 20 m and a measuring accuracy in the depth direction of as low as about 1/200 of the measurement limit, and thus cannot be used for purposes of factory automation. Some sensors, which are still in the development stage, have short measurement limits and high resolutions in the depth direction, but they are expensive and do not meet the requirements for practical use.

Active sensors include those using a light projecting method based on triangulation, besides the above-described type. The active sensors based on light projection techniques employ a method in which more than ten patterns of light are projected onto an object to obtain a distance image, or a method in which an object is scanned with a laser slit light deflected by a movable mirror to obtain a range image. In the latter method, in order to recognize an object based on the obtained range image in measuring the position and orientation of the object, it is necessary that the range image be obtained by densely scanning the object with the laser slit light, to thereby eliminate data skip (data omission). However, for a screen size of 256×256 pixels commonly used in visual sensors of robots, 200 to 300 scans of slit light must be carried out, and as many images as the number of the scans need to be obtained with the camera.

As outlined above, in the conventional methods, a lot of time is required for the image acquisition or for the subsequent distance image transformation, or for the detection of an object from the obtained range image because of a vast amount of data. Thus, the long processing time has been the major drawback to the practical use of the conventional methods.

In order to shorten the processing time, there has been proposed a three-dimensional visual sensor in which crossed laser slit lights are projected onto an object, and the object is detected based on the obtained image information in measuring its three-dimensional position and orientation. This visual sensor is effective in detecting an object having a simple shape, but is not good enough in detecting an object of complicated configuration, because the available information is not large enough.

Thus, as discussed in the foregoing, the practical visual sensors capable of measuring the three-dimensional position and orientation of an object of complicated shape with high accuracy and in a short processing time matching with the acting time of robots are not yet available.

SUMMARY OF THE INVENTION

An object of the present invention is to provide a method and an apparatus capable of measuring the three-dimensional position and orientation of an object having a complicated shape with high accuracy and in a short processing time as a solution to the problem discussed above.

To achieve the above object, the present invention provides a method comprising the steps of: projecting a slit light of a first direction onto an object while scanning the object in a direction different from the first direction; projecting a slit light of a second direction perpendicular to the first direction onto the object while scanning the object in a direction different from the second direction; obtaining edge information or edge and plane information of the object by processing images of the projected slit lights; and determining the position and orientation of the object based upon previously obtained edge information and shape information.

Preferably, the image processing step includes: a step of analyzing the slit light image obtained during each scanning into a straight-line sequence of points which may include a disconnection or bend; a step of obtaining an endpoint and a bent point corresponding, respectively, to the disconnection and bend of the straight-line sequence of points, based upon the point sequence information; a step of specifying, among the endpoints and bent points obtained with the slit lights of the first direction, a group of endpoints and bent points that lie on an identical straight line, and specifying, among the endpoints and bent points obtained with the slit lights of the second direction, a group of endpoints and bent points that lie on an identical straight line; and a step of using a straight line composed of the specified group of points as edge information of the object.

An apparatus according to the present invention comprises: a light projecting means including projecting means for projecting a first slit light and a second slit light of different directions onto an object, and scanning means for successively shifting the first and second slit lights in different directions by a predetermined amount; imaging means responsive to shifting of the slit lights in the respective directions caused by the scanning means, for obtaining a first multiple slit light image and a second multiple slit light image, respectively; image processing means for extracting edge information of the object from the first and second multiple slit light images; and position/orientation calculating means for calculating the three-dimensional position and orientation of the object based on the edge information and shape information of the object.

Preferably, the light projecting means comprises first and second light projectors arranged in different positions with respect to the imaging means, the first light projector includes projecting means for projecting the first slit light and scanning means for successively shifting the first slit light by a predetermined amount in a direction almost perpendicular to that of the first slit light, and the second light projector includes projecting means for projecting the second slit light and scanning means for successively shifting the second slit light by a predetermined amount in a direction almost perpendicular to that of the second slit light.

Preferably, the imaging means comprises a solid-state imaging camera; the first light projector, positioned in a horizontal relation to the solid-state imaging camera, includes projecting means for projecting the first slit light extending in a vertical direction with respect to a visual field of the solid-state imaging camera, and the second light projector, positioned in a vertical relation to the solid-state imaging camera, includes projecting means for projecting the second slit light extending in a horizontal direction with respect to the visual field of the solid-state imaging camera.

Preferably, the projecting means included in each of the first and second light projectors comprises a laser diode connected to a laser power supply, and a cylindrical lens.

According to another preferred embodiment, the light projecting means comprises a single light projector arranged in one spatial position, the projector including projecting means for projecting the first and second slit lights and scanning means for successively shifting the first and second slit lights in different directions by a predetermined amount.

More preferably, the projecting means of the light projector for projecting the first and second slit lights comprises first and second slit light generating means connected to a laser power supply, and optical-axis adjusting means for aligning optical axes of the slit lights radiated from the first and second slit light generating means with each other is arranged between the scanning means for successively shifting the first and second slit lights in different directions by a predetermined amount and the first and second slit light generator means.

Preferably, the optical-axis adjusting means comprises a half-prism or a half-mirror and a shield plate.

More preferably, the light projector comprises slit light generating means for radiating a slit light of any desired direction, and slit-light projecting direction changing means for rotating the slit light generating means about an optical axis, and the slit-light projecting direction changing means is operated to cause the first and second slit light to be radiated.

Further preferably, the scanning means for successively shifting the first and second slit lights by a predetermined amount comprises a rotary mirror.

As described above, according to the present invention, first and second slit lights of different directions are individually projected onto an object while being shifted by a predetermined amount, to thereby obtain respective multiple slit light images. Where an edge (ridgeline) of the object extends in a direction to intersect the slit light, the resulting slit light image is bent or disconnected at the edge, and such bend or disconnection is detected to obtain edge (ridgeline) information. Even if an edge of the object is parallel to and thus does not intersect one of the first and second slit lights, such an edge intersects the other slit light without fail. Thus, edges of any direction always intersect with at least one of the first and second slit lights. Consequently, the scanning intervals of the individual slit lights may be coarse, whereby the processing for detecting an object is shortened and the amount of data obtained by the detection process is reduced. Further, not only is the processing time for measuring the position/orientation of the object based upon the derived data shortened, but high-accuracy is ensured, and thus the present invention provides useful position/orientation measuring means for robots.

DETAILED DESCRIPTION OF THE PREFERRED EMBODIMENTS

Figure 1:
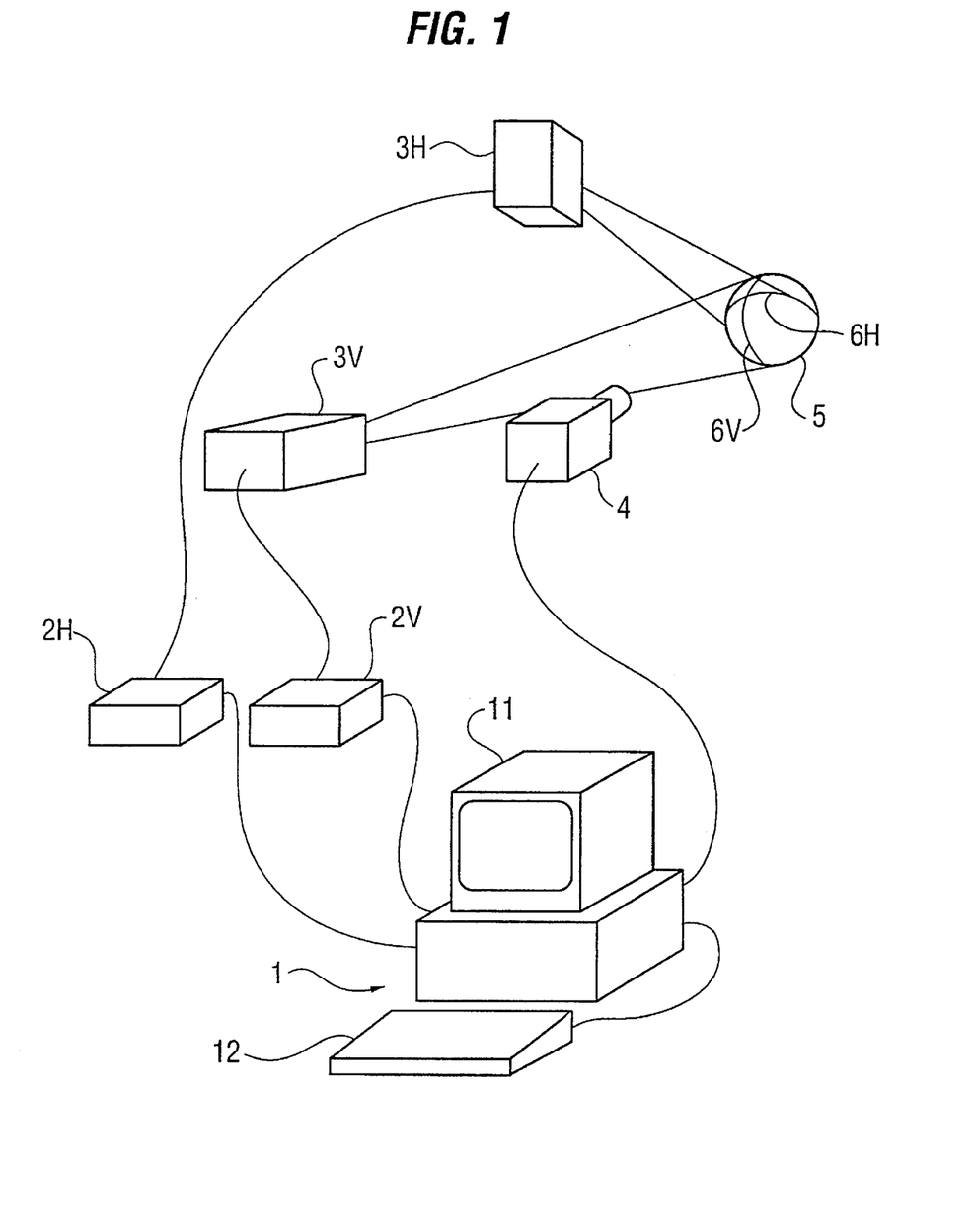
FIG. 1 is a schematic view showing a three-dimensional position/orientation measuring apparatus according to a first embodiment of the present invention.
Figure 2:
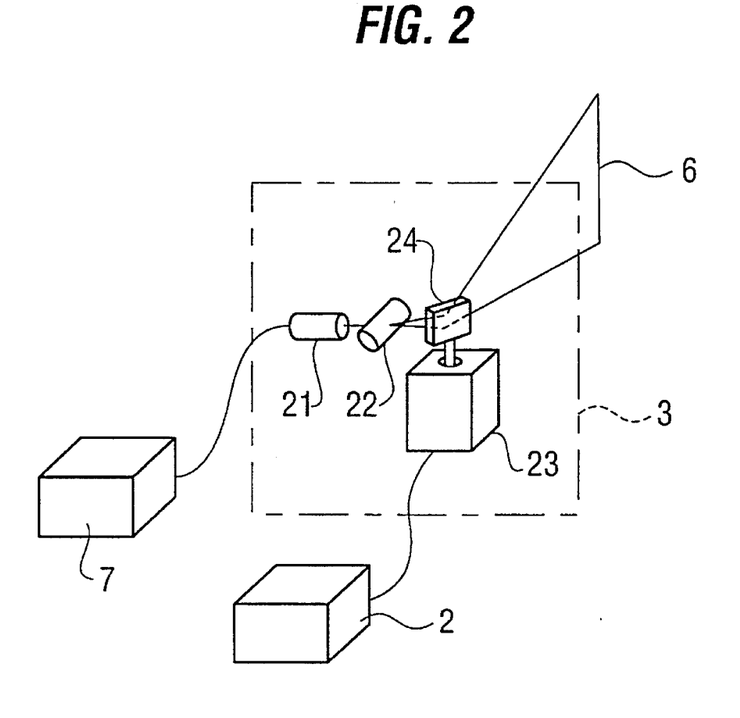
FIG. 2 is a view showing the arrangement of a light projector of the first embodiment.

FIG. 1 schematically illustrates a three-dimensional position/orientation measuring apparatus according to a first embodiment of the present invention, and FIG. 2 illustrates the arrangement of a light projector used in the apparatus.

The first embodiment will be described with reference to FIG. 1. A first light projector 3V is arranged so as to be horizontally aligned with a solid-state imaging camera (hereinafter referred to as "CCD camera") 4, and a second light projector 3H is arranged so as to be vertically aligned with the CCD camera 4. Specifically, the first light projector 3V is positioned so that a vertical slit light 6V with respect to the visual field of the CCD camera 4 is projected therefrom onto an object 5, and the second light projector 3H is positioned so that a horizontal slit light 6H with respect to the visual field of the CCD camera 4 is projected therefrom onto the object 5. The first and second light projectors 3V and 3H are connected to control amplifiers 2V and 2H, respectively. The control amplifiers 2V and 2H and the CCD camera 4 are connected to an image processing apparatus 1.

A laser power supply is omitted from FIG. 1. In the figure, reference numeral 11 represents a display device connected to the image processing apparatus, and 12 represents a keyboard. The image processing apparatus 1 is composed of a main processor, frame memories, a memory storing a control program, a program memory, a communication interface, an image processor, etc. The arrangement of the image processing apparatus is identical with that of a conventional apparatus, and therefore, a description thereof is omitted. Further, in FIG. 1 a spherical body is illustrated as an object 5 to be measured. The figure shows a state in which the slit lights 6V and 6H are projected from the first and second light projectors 3V and 3H, respectively, and the projected lights 6V and 6H traverse the surface of the spherical body in the longitudinal direction and the latitudinal direction, respectively.

The light projectors used in this embodiment will be described with reference to FIG. 2. A laser diode 21 is connected to a laser power supply 7, and a scanner 23 is connected to the control amplifier 2. A laser beam output from the laser diode 21 passes through a cylindrical lens 22 where it is expanded in one direction and formed into a slit light, and this slit light 6 is reflected at a rotary mirror 24 of the scanner 23 to be projected onto the object. The control amplifier 2 connected to the scanner 23 outputs a signal to rotate the shaft of the scanner 23 by an angle corresponding to an external voltage signal supplied thereto. A sensor for detecting the angle of rotation of the shaft is contained in the scanner 23, and the output of this sensor is fed back to the control amplifier 2 to achieve servo control such that the rotational position of the rotary mirror 24 attached to the shaft of the scanner 23 is accurately determined. The light projector 3 has an arrangement similar to that of a conventional light projector designed to project a slit light for scanning.

The operation of the first embodiment will be now described.

Figure 3:
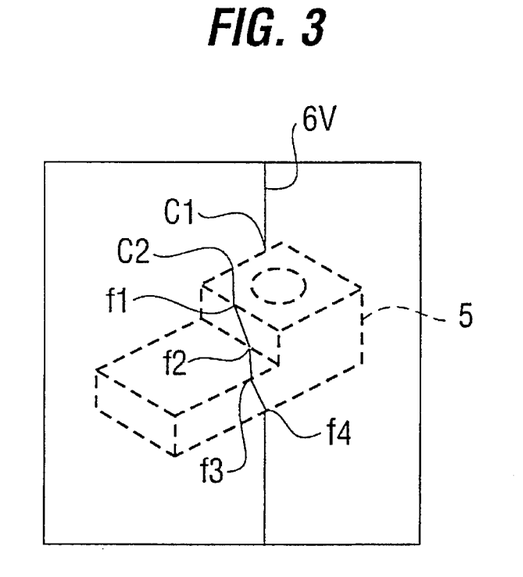
FIG. 3 is a diagram illustrating a slit light image obtained according to the first embodiment when a vertical slit light is projected onto an object.

First, only the first light projector 3V is operated to project the vertical slit light 6V onto an object 5 having a shape as indicated by the dashed lines in FIG. 3. Thus, the slit light falls upon various parts of the object, forming a bent line 6V as shown in FIG. 3, which includes bends (bent points f1, f2, f3 and f4) and a disconnection (endpoints c1 and c2).

An image of the slit light like the above-described one is obtained by the CCD camera 4, but the shape of the slit light on the object cannot be obtained from only the image of the object with the slit light projected thereon. Therefore, first, a grey-scale image (hereinafter referred to as "background image") of the object is obtained with no slit light projected onto the object, and a difference between the background image and an image obtained with the slit light projected onto the object is obtained to thereby extract only the information of the slit light image. Based on the extracted image information, center-point sequence data of the image of the slit light 6V is obtained.

Figure 4:
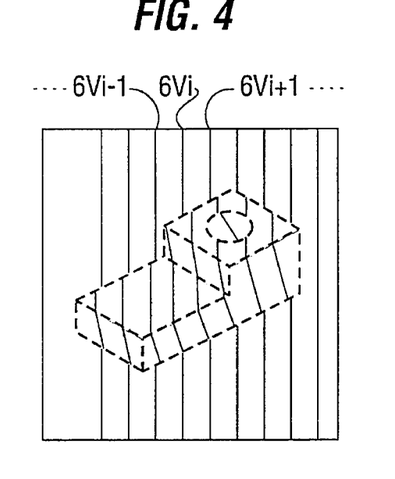
FIG. 4 is a diagram showing slit light images obtained by scanning the object several times with the vertical slit light.

A move command for movement over a preset angle is outputted from the image processing apparatus 1 to the light projector 3V via a D/A converter (not shown), to shift the position of projection of the slit light with respect to the object 5. That is, the shaft of the scanner 23 is rotated by the preset amount by the control amplifier 2V, and then the rotary mirror 24 is set in position, whereby the direction of projection of the slit light 6V is changed. Then, the slit light is projected to a position on the object different from the previous position, to obtain a slit light image and center-point sequence data in the manner described above. The object is thereafter successively scanned with the slit light 6V to obtain slit light images ( . . . , 6Vi−1, 6Vi, 6Vi+1, . . . ) of predetermined intervals as shown in FIG. 4, and center-point sequence data of each slit light image is obtained.

Figure 5:
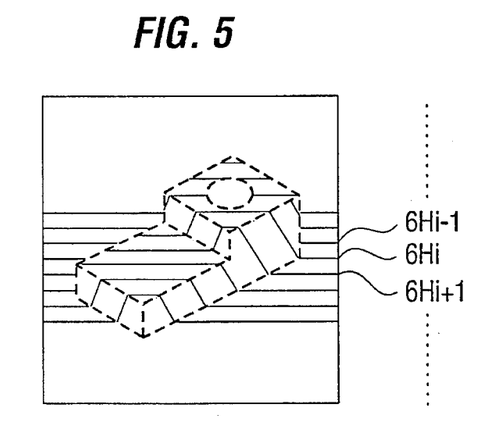
FIG. 5 is a diagram showing slit light images obtained by scanning the object several times with a horizontal slit light.

Subsequently, the horizontal slit light 6H is projected from the second light projector 3H onto the same object, the object is successively scanned with the horizontal slit light 6H in a similar manner to obtain slit light images ( . . . , 6Hi−1, 6Hi, 6Hi+1, . . . ) including bends and/or disconnections as shown in FIG. 5, and center-point sequence data of each slit light image is also obtained.

A plurality of vertical and horizontal center-point sequence data thus obtained are individually approximated to a straight line, and data of each bend (bent point) and each disconnection (endpoint) in the approximated lines is obtained.

Then, the bent points, endpoints, and straight lines connecting with these points, obtained from the vertical slit light images ( . . . , 6Vi−1, 6Vi, 6Vi+1, . . . ), are analyzed to classify the bent points and endpoints into groups that are considered to lie on the same straight line. Based on the groups of points, edge (ridgeline) data of the object is obtained. The edges to be detected in this case are limited to those which can surely be detected with the vertical slit light, that is, horizontally longitudinal edges inclined at 45 degrees or less with respect to the horizontal axis of the image.

Subsequently, the bent points, endpoints, and straight lines connecting with these points, obtained from the horizontal slit light images ( . . . , 6Hi−1, 6Hi, 6Hi+1, . . . ) are analyzed to classify the bent points and endpoints into groups that are considered to lie on the same straight line. Based on the thus obtained groups of points, edge (ridgeline) data of the object is obtained. The edges detected in this case are limited to those which can be detected with the horizontal slit light, that is, vertically longitudinal vertical edges inclined at 45 degrees or more with respect to the horizontal axis of the image.

Using a distance transformation matrix obtained by a previously executed calibration, three-dimensional coordinates of the individual points on the edges are calculated, and, based on the obtained data and prestored shape data of the object, three-dimensional position and orientation of the object are determined.

Figure 6:
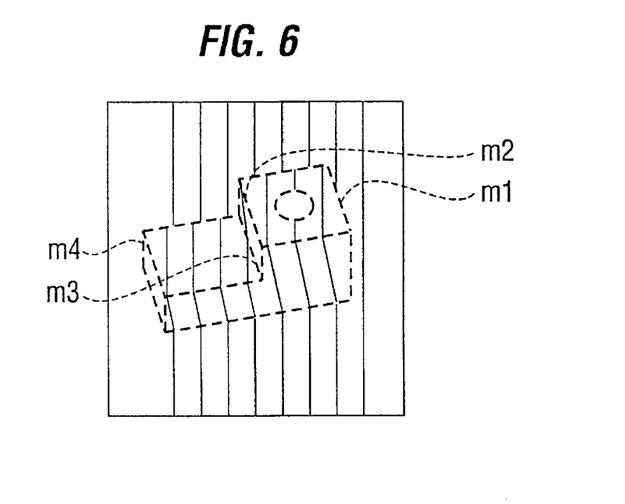
FIG. 6 is a diagram illustrating a case wherein simply executing the vertical slit-light scanning alone is sometimes not good enough to detect edges of the object.

In this embodiment, the position and orientation of an object are determined in the above-described manner. The object is scanned in two directions, i.e., vertically and horizontally, with the slit light because, if the object is scanned only in one direction, and if the intervals of projection of the slit light are broad, some edges (ridgelines) of the object may not involve three or more points (bent points and/or endpoints) when detected with the slit light, depending upon the orientation of the object. This will be explained with reference to FIG. 6. If the object is scanned only with the vertical slit light and if the intervals of projection are large, edges m1 to m4 of the object, among the edges indicated by the dashed lines in the figure, may not be traversed at all or may be traversed once or so by the slit light, because the edges m1 to m4 are nearly parallel to the slit light. Thus, some edges remain undetected when the object is scanned only in one direction. These edges, however, can surely be detected if the object is scanned with the slit light in a different direction, i.e., with the horizontal slit light. In other words, by projecting the slit lights in two different directions, i.e., in vertical and horizontal directions, onto the object, it is possible to reliably detect the individual edges of the object with at least one of the slit lights, regardless of the orientation of the object. Therefore, the scanning intervals of individual slit lights need not be fine, that is, the scanning intervals may be considerably rough.

Figure 7:
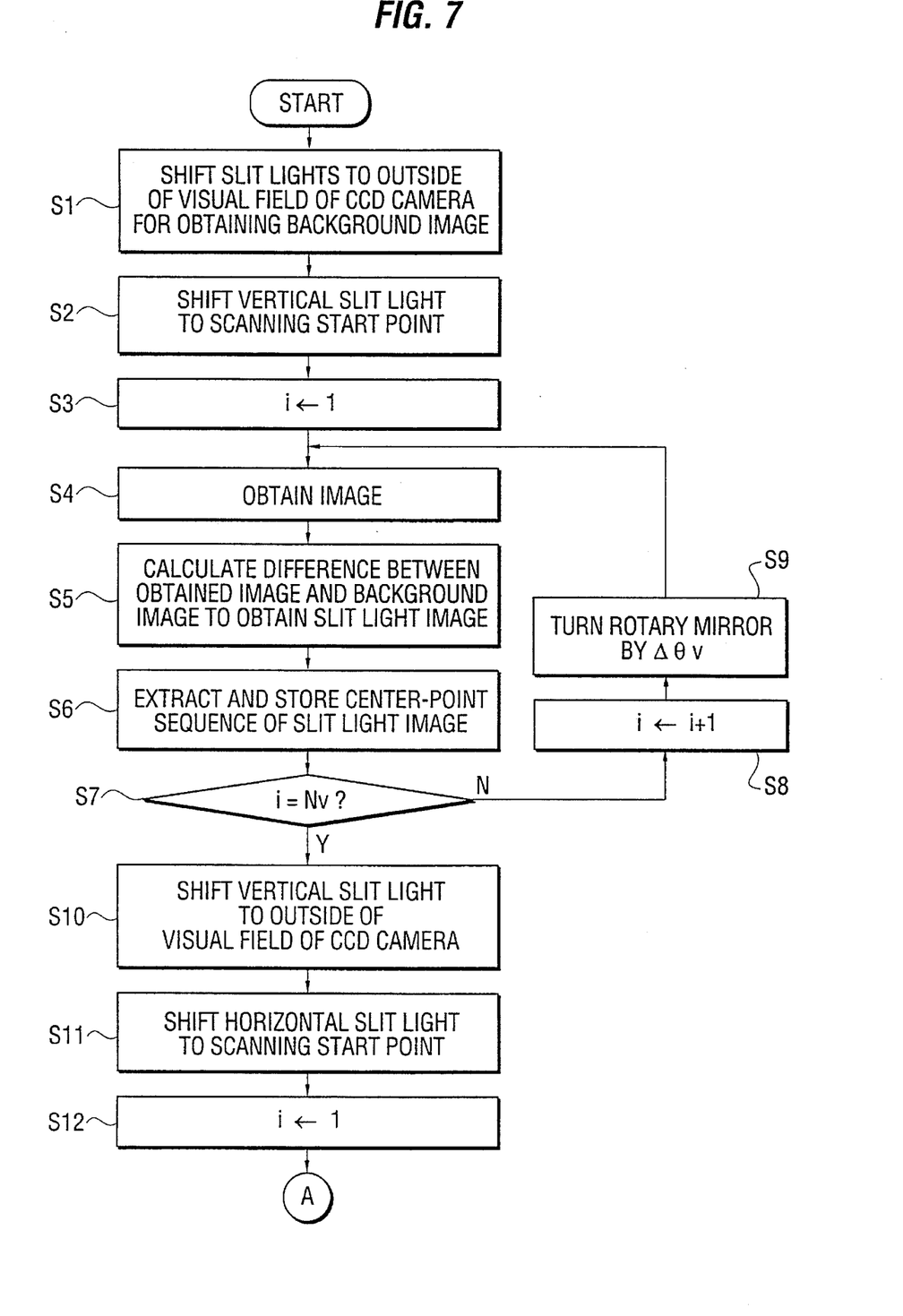
FIG. 7 is a flow chart of an object position/orientation measuring processing executed by an image processing apparatus of the first embodiment.

FIG. 7 illustrates a flow chart of a process for detecting the position and orientation of an object according to the first embodiment, which is executed by the main processor of the image processing apparatus 1. Referring to the flow chart of FIG. 7, the operation according to the first embodiment will be described.

Before starting the process, calibration is previously executed to obtain a distance transformation matrix, which is then stored in the image processing apparatus 1 together with the object shape data, so that three-dimensional coordinates of the individual points of the point-sequences, obtained through the projection of the slit lights, can be calculated. Further, according to the shape of the object, intervals of projection of the slit lights, i.e., angles Δθv and Δθh through which the shafts of the rotary mirrors 24 of the scanners 23 for projecting the vertical and horizontal slit lights, respectively, are to be rotated at a time, and numbers of scans, Nv and Nh, to be effected with the vertical and horizontal slit lights, respectively, are set.

When the image processing apparatus 1 is then operated, the main processor of the apparatus 1 actuates the light projectors 3V and 3H through the respective D/A converters and control amplifiers 2V and 2H so that the vertical and horizontal slit lights 6V and 6H are shifted outside the visual field of the CCD camera 4, or outputs an imaging command to the CCD camera 4 without actuating the light projectors 3V and 3H to obtain a background image (grey-scale image of the object) (Step S1).

Then, the scanner 23 of the first light projector 3V is driven to rotate the rotary mirror 24 so that the vertical slit light 6V is shifted to a scanning start point (Step S2). An index i, which represents the number of scans, is set to "1" (Step S3), and an imaging command is outputted to the CCD camera 4 to obtain an image of the object with the vertical slit light 6V projected thereon (Step S4). The background image obtained in Step S1 is subtracted from the previously obtained image to obtain a difference therebetween, i.e., an image including the slit light alone (hereinafter referred to as "slit light image"), and a center-point sequence of the slit light image is extracted and stored (Steps S5 and S6). The slit light image has a certain width, and, therefore, to obtain data of points (sequence), the obtained image information is subjected, e.g., to a weighted averaging process.

It is then determined whether the index i has reached the preset number Nv, the number times of the scanning is to be carried out with the vertical slit light (Step S7), and, if the preset number Nv has not yet been reached, the index i is incremented by "1", the rotary mirror 24 of the light projector 3V is rotated by the preset angle Δθv corresponding to one scan of the vertical slit light (Steps S8 and S9), and the program returns to Step S4. Steps S4 through S9 are thereafter repeated until the value of the index i reaches the preset number Nv, whereby center-point sequences of Nv (=preset value i) slit light images are obtained.

When the index i has reached the preset value Nv, the vertical slit light 6V is shifted to the outside of the visual field of the CCD camera, or the operation of the light projector 3V is stopped, whereas the scanner 23 of the second light projector 3H is actuated through the control amplifier 2H to rotate the rotary mirror so that the horizontal slit light is shifted to a scanning start point (Steps S10 and S11). Then, the index i representing the number of scans is set to "1" (Step S12), and steps similar to Steps S4 to S9 are executed to extract and store center-point sequences of horizontal slit light images (Steps S13 to S18).

In this case, however, the rotary mirror 24 of the light projector 3H is successively rotated by the preset angle Δθh until the index i reaches the preset number Nh, the number of times the scanning should be carried out with the horizontal slit light. Thus, when the index i has reached the preset number Nh, center-point sequences of Nh horizontal slit light images are obtained.

After the scanning with the vertical slit light 6V and the scanning with the horizontal slit light 6H are completed, the center-point sequence of each vertical slit light image is subjected to bent-line approximation, to obtain bent points and endpoints (Step S19).

That is, when the vertical slit light 6V is projected onto an object, the resulting slit light image is bent or cut at an edge (ridgeline) of the object as shown in FIGS. 3 and 4, i.e., a bent line including a bent point and/or endpoint is formed, depending upon the shape of the object. The slit light image is processed to obtain a center-point sequence, which is then approximated to a bent line, and based on the approximated bent line, bent points and endpoints lying on edges of the object are obtained. After obtaining the bent points and endpoints of the individual slit light images in this manner, the bent points and endpoints are grouped in such a manner that the points in one group lie on the same straight line (Step S20).

Whether these bent points and endpoints lie on the same straight line or not can be determined through the Hough transform processing. Alternatively, the bent points and endpoints lying on the same straight line can be extracted by checking whether there is any other point lying on a straight line passing through two points close to each other.

Figure 8:
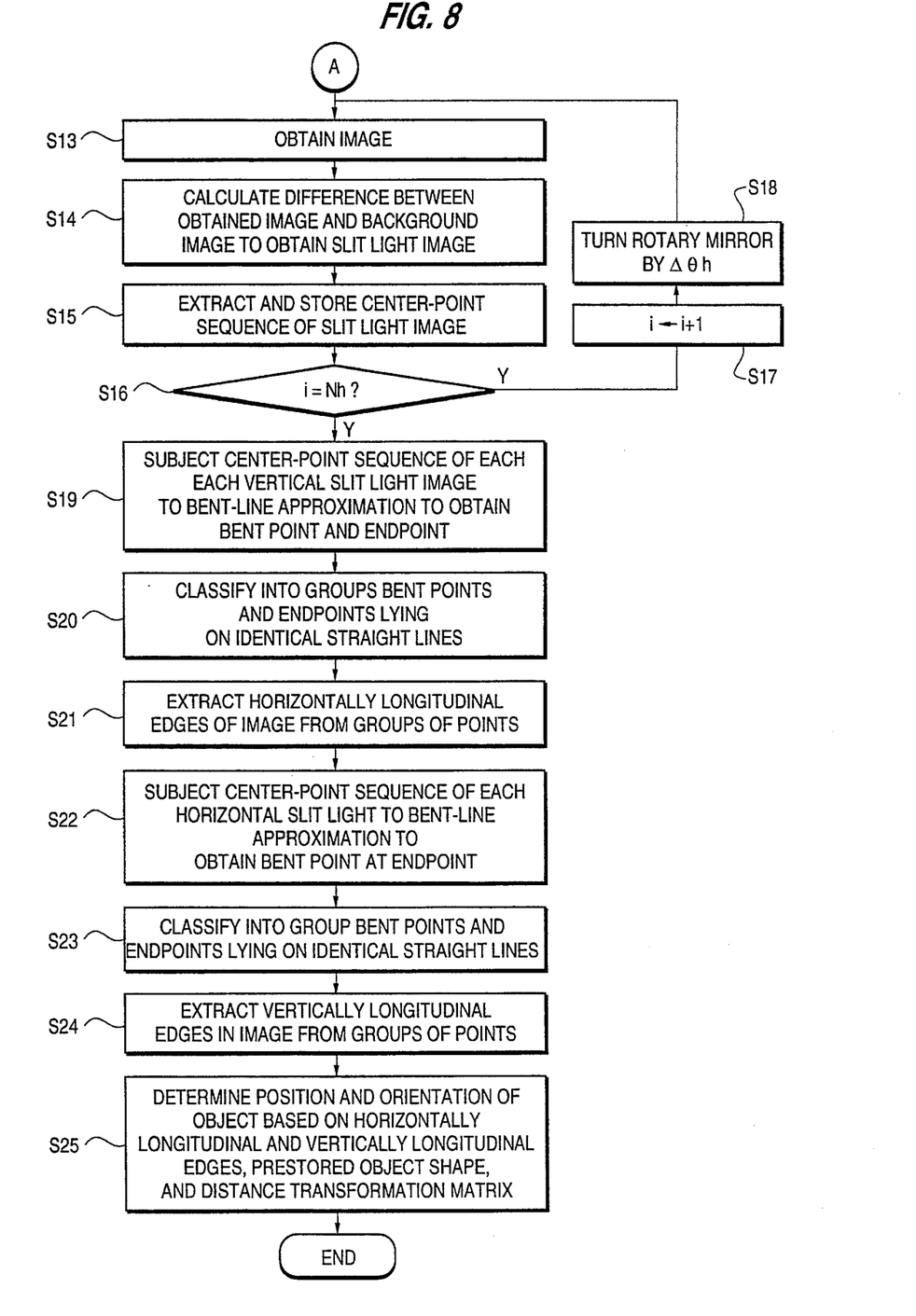
FIG. 8 is a flow chart continued from FIG. 7.

Among the groups of points thus classified, straight point-sequences which are longer in the horizontal direction than in the vertical direction on the screen are defined as edges (ridgelines) of the object (Step S21). The edge defined in this case is a straight edge (segment of horizontally longitudinal straight line) inclined at 45 degrees or less with respect to the horizontal axis of the image, i.e., a horizontal edge.

Similarly, the center-point sequence of each horizontal slit light image is approximated to a bent line to obtain bent points and endpoints (Step S22); the bent points and endpoints are classified into groups lying on identical straight lines (Step S23); and straight lines individually composed of a vertical point-sequence in the image are extracted as vertical edges of the object (Step S24). That is, straight point-sequences inclined at 45 degrees or more with respect to the horizontal axis of the image are extracted as vertically longitudinal edges.

Based on the horizontal and vertical edge data thus obtained and the preset shape data of the object, the orientation of the object is determined, and three-dimensional coordinates of the object are obtained by using the distance transformation matrix (Step S25) to terminate the object detecting process.

In the foregoing, the position and orientation of the object are specified by obtaining all edges, but the object may be specified by obtaining several edges and planes. A plane of an object can be specified by observing that a slit light projected on a plane forms a straight-line image and that adjacent slit lights projected on the same plane are parallel to the straight-line image. The specified edges and planes are analyzed to find their correspondence with the edges and planes of the object, thus determining the position and orientation of the object.

The measurement data obtained in this manner is supplied to a robot control device, as in a conventional system. Based on the supplied data, the robot control device corrects previously taught command data and controls the robot operation, whereby tasks can accurately be performed on the object.

As described above, in this embodiment, slit light is projected in two different directions, i.e., in vertical and horizontal directions, onto an object to obtain slit light images, and thus, edges (ridgelines) of the object can easily be detected even in the case where the scanning intervals or the intervals of slit lights, are large. More particularly, edges inclined at 45 degrees or less with respect to the horizontal axis of the image can be easily detected with the vertical slit light, and edges inclined at more than 45 degrees to the same axis can easily be detected with the horizontal slit light. Thus, the amount of shift of the slit light, i.e., the scanning angle $\Delta\theta v$ or $\Delta\theta h$ ($\Delta\theta v$ and $\Delta\theta h$ may be equal to each other), can be set to a large value such that an edge to be detected, which is inclined exactly at 45 degrees with respect to the horizontal axis of the image, can be detected with one or both of the vertical and horizontal slit lights. In the case of the conventional method in which the scanning with the slit light is made only in one direction, 200 to 300 scans are necessary for measuring the position and orientation of the object, whereas only 10 to 20 scans in total with the vertical and horizontal slit light will suffice the same need in the case of the method according to the present embodiment.

In the first embodiment, two light projectors for respectively projecting a vertical slit light and a horizontal slit light are used, but in the case where the processing time is not a matter of concern, a single light projector may be used. For example, in FIG. 1, after projecting a vertical slit light from the light projector 3V onto an object and scanning the object with the vertical slit light, the whole of the light projector 3V may be moved to the position where the light projector 3H is located in FIG. 1, and then rotated through 90 degrees about the optical axis, whereby a horizontal slit light can be projected therefrom onto the object.

Figure 9:
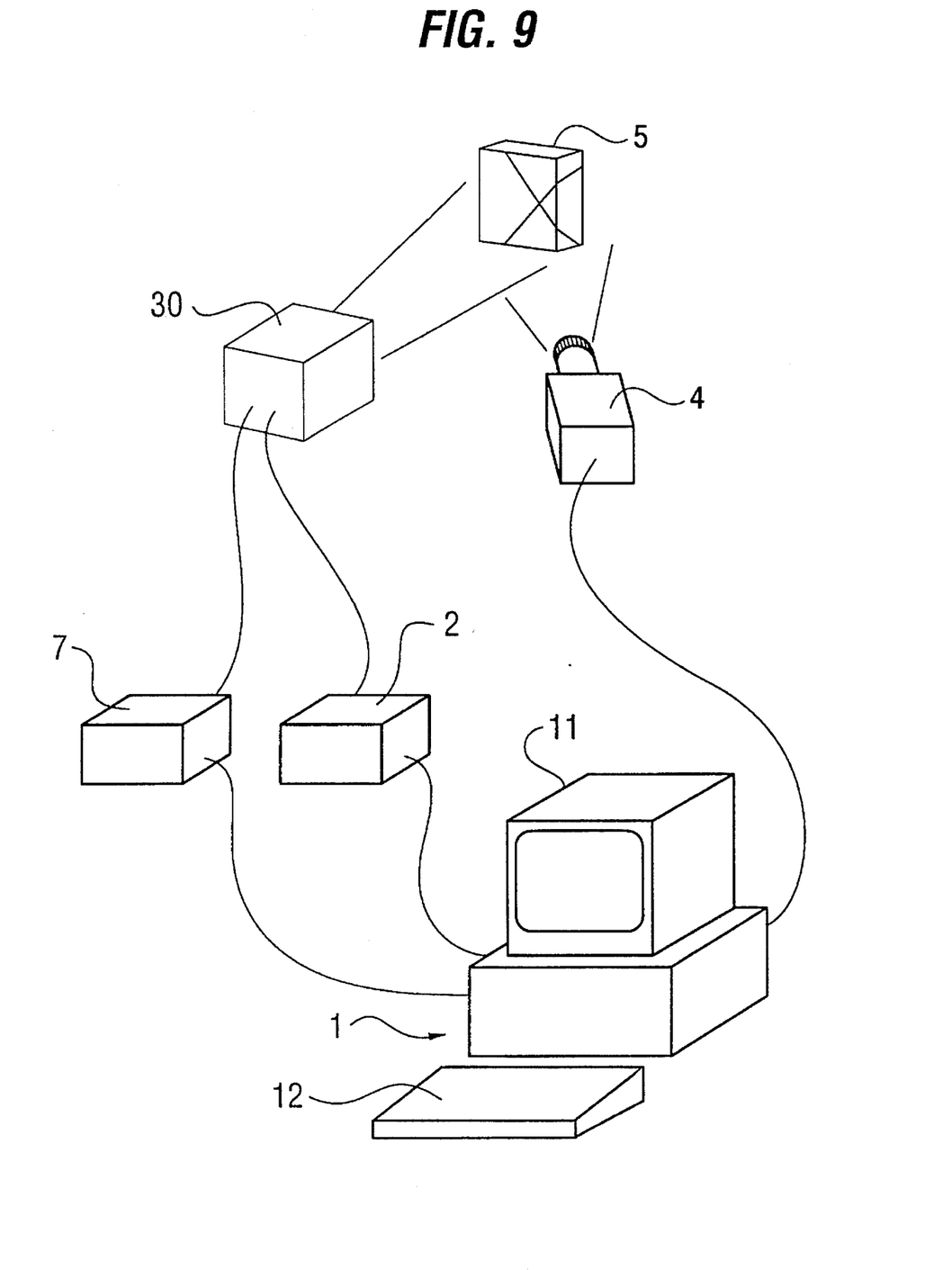
FIG. 9 is a schematic view showing a three-dimensional position/orientation measuring apparatus according to a second embodiment of the present invention.

FIG. 9 schematically illustrates a three-dimensional position/orientation measuring apparatus according to a second embodiment of the present invention. In the figure, like reference numerals are used to denote like elements shown in FIG. 1. The second embodiment differs from the first embodiment in that a single light projector 30 is placed at one spatial position for projecting slit light. Specifically, the light projector 30 is placed at a position displaced in a predetermined direction and at a predetermined distance from a CCD camera 4, for projecting onto an object two slit lights of different directions with respect to the visual field of the CCD camera. The light projector 30 is connected to a laser power supply 7 and a scanner control amplifier 2. The CCD camera 4, the laser power supply 7, and the control amplifier 7 are connected to an image processing apparatus 1. A display device 11 and a keyboard 12 are connected to the image processing apparatus 1.

Figure 10:
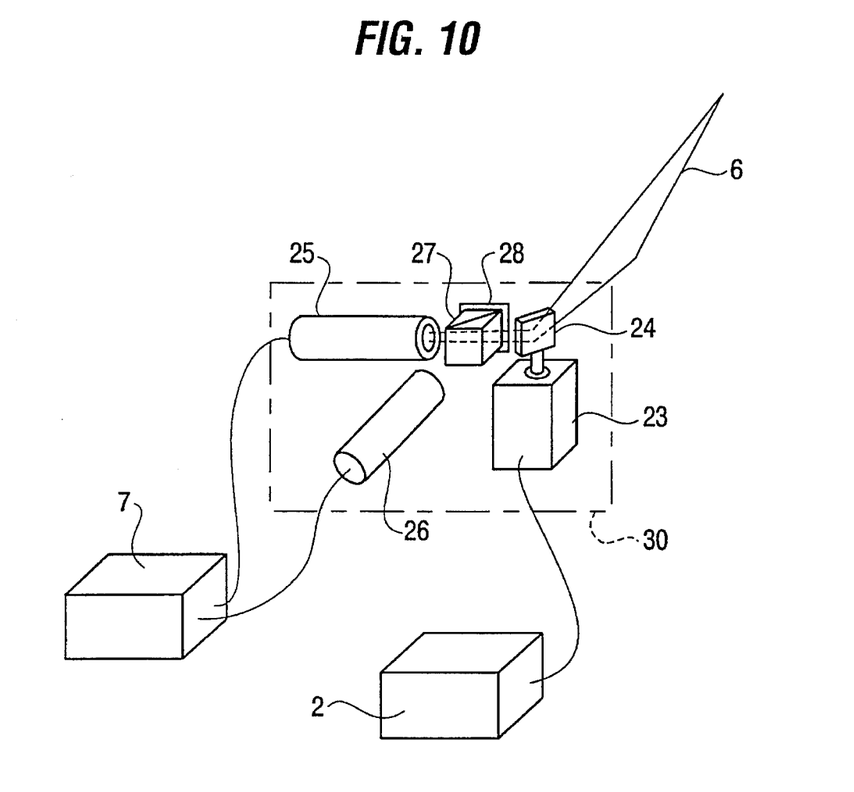
FIG. 10 is a schematic view of a light projector of the second embodiment, illustrating a state in which a first slit light is projected.

As shown in FIG. 10, the light projector 30 of the second embodiment comprises slit light generators 25 and 26, connected to the laser power supply 7, for generating first and second slit lights, respectively, and a half-prism 27 and a shield plate 28, which serve as a means for aligning in one direction the optical axes of the slit lights radiated from the first and second slit light generators 25 and 26. A rotary mirror 24 is attached to the shaft of a scanner 23 which is connected to the control amplifier 2.

When the first slit light generator 25 is turned ON, and the second slit light generator 26 is turned OFF so that the first slit light is radiated from the first slit light generator 25 as shown in FIG. 10, the first slit light passed through the half-prism 27 is reflected at the rotary mirror 24, and then is projected onto an object 5. Light reflected from the half-prism 27 is absorbed by the shield plate 28.

Figure 11:
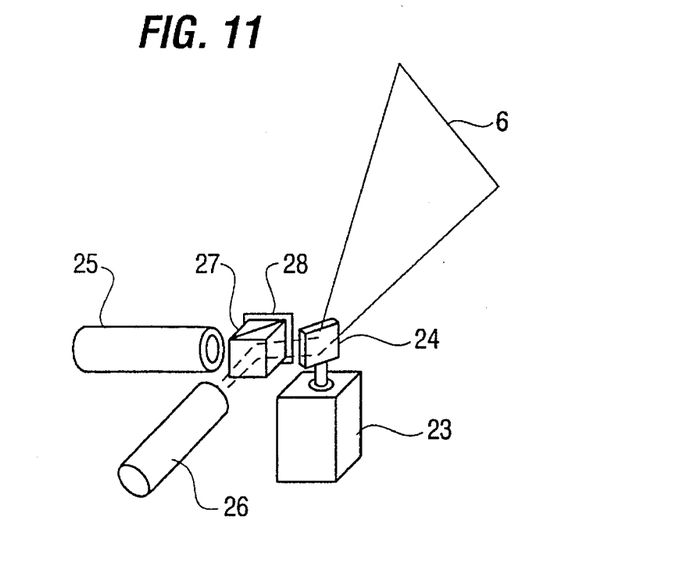
FIG. 11 is a view of the light projector of the second embodiment, illustrating a state in which a second slit light is projected.

When the second slit light generator 26 alone is turned ON as shown in FIG. 11, the second slit light radiated from the second slit light generator 26 is reflected at the half-prism 27 in such a manner that the optical axis thereof is aligned with that of the first slit light, is further reflected at the rotary mirror 24, and then is projected onto the object. The projected second slit light is perpendicular to the first slit light. Light transmitted through the half-prism 27 is absorbed by the shield plate 28. Instead of the half-prism 27, a half-mirror may be used.

The scanner 23 used in this embodiment is constructed and operated in the same manner as the counterpart in the first embodiment. As in the first embodiment, the scanner 23 is actuated to turn the rotary mirror 24 through a predetermined angle at a time so that the first or second slit light is correspondingly shifted for scanning.

An object position/orientation detecting process executed by the main processor of the image processing apparatus 1 is substantially identical with the process of the first embodiment shown in the flow chart of FIGS. 7 and 8, except that the "vertical slit light" and "horizontal slit light" in the flow chart of FIGS. 7 and 8 should be read as the "first slit light" and "second slit light," respectively far application to the second embodiment. Further, Step S1 should be changed to "Turn the first and second slit light generators OFF and obtain a background image." Step S2 should be changed to "Turn the first slit light generator 25 ON, and shift the first slit light to the scanning start point."; and Step S10 should be changed to "Turn the first slit light generator 25 OFF, and turn the second slit light generator 26 ON."

Figure 12:
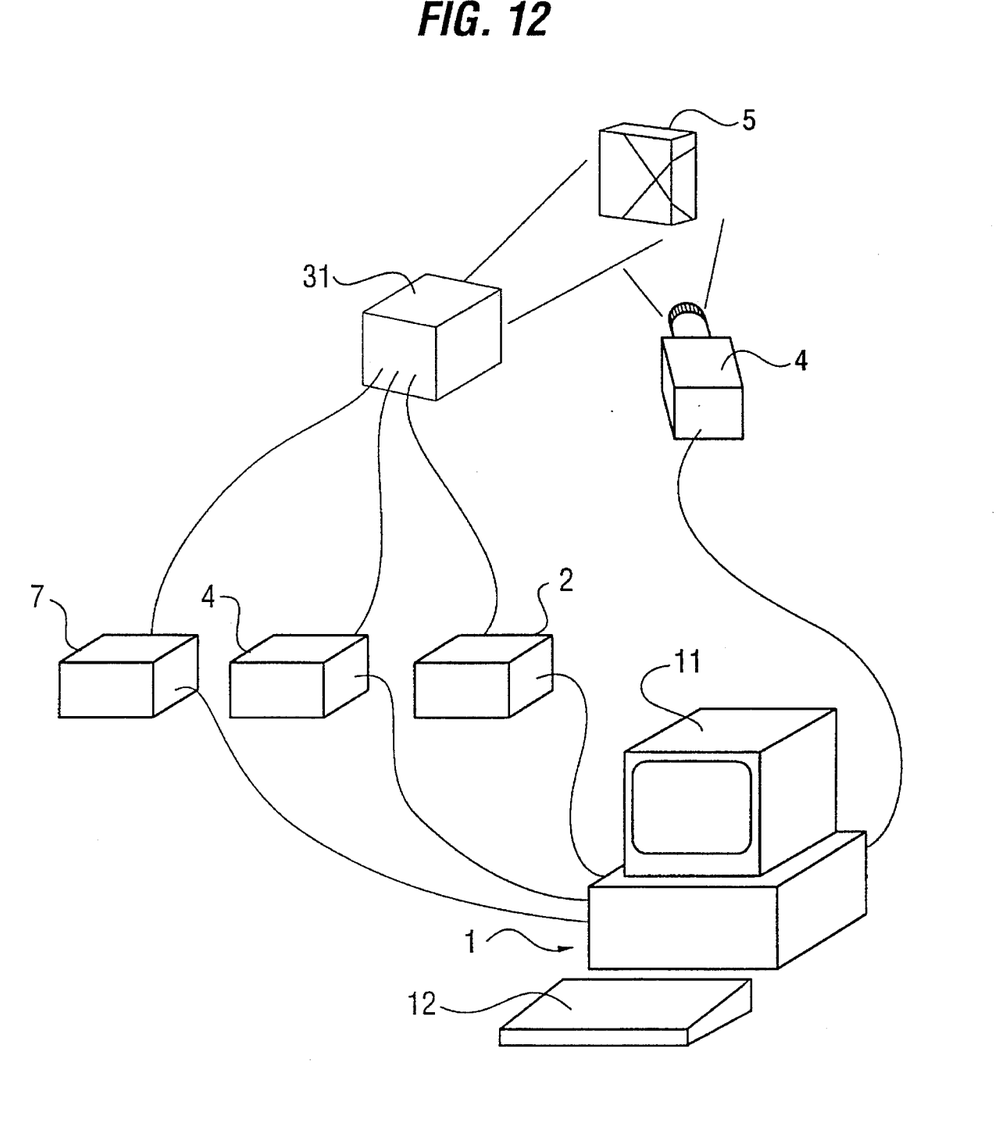
FIG. 12 is a schematic view showing a three-dimensional position/orientation measuring apparatus according to a third embodiment of the present invention.
Figure 13:
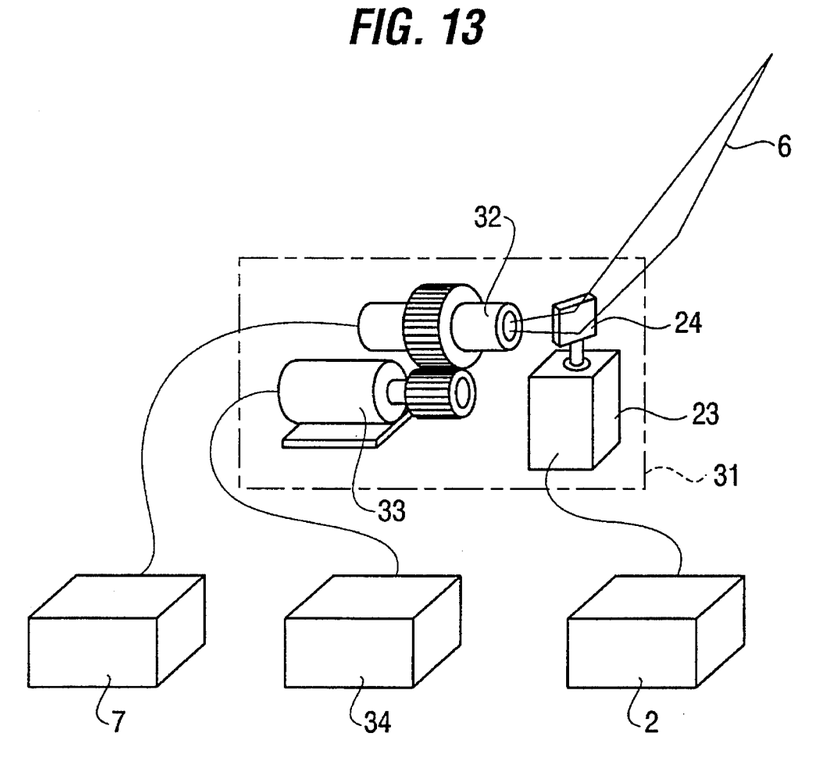
FIG. 13 is a schematic view of a light projector of the third embodiment, illustrating a state in which a first slit light is projected.

FIG. 12 schematically illustrates a three-dimensional position/orientation measuring apparatus according to a third embodiment of the present invention, and, in the figure, like reference numerals are used to represent like elements appearing in the first embodiment. The third embodiment differs from the first and second embodiments in the structure of the light projector. FIG. 13 shows the arrangement of a light projector 31 used in the third embodiment, and this light projector 31 differs from the counterpart used in the first and second embodiments in that it includes a means for changing the direction of projection of the slit light. Specifically, the light projector of the third embodiment includes, as the means for changing the direction of projection of the slit light, a motor 33 for rotating a slit light generator 32 about the optical axis through a transmission mechanism such as gears, and a slit direction controller 34 for driving the motor 33 to change the slit direction. The slit direction controller 34 is connected to an image processing apparatus 1, and the slit light generator 32 is connected to the image processing apparatus 1 via a laser power supply 7. A rotary mirror 24, which reflects slit light to project it onto an object, is actuated by a scanner 23 connected to the image processing apparatus 1 via a control amplifier 2.

Figure 14:
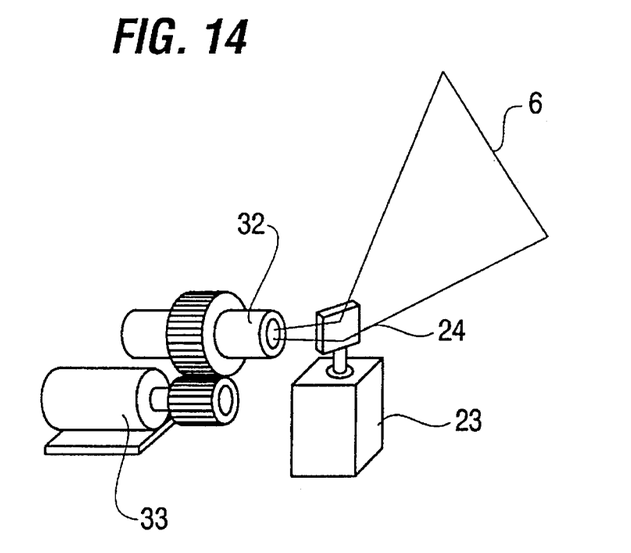
FIG. 14 is a view of the light projector of the third embodiment, illustrating a state in which a second slit light is projected.

The motor 33 is driven through the slit direction controller 34 to position the slit light generator 32 so that a first slit light is to be radiated, as shown in FIG. 13. The laser power supply 7 is then driven to radiate the first slit light from the slit light generator 32, while the scanner 23 is actuated so that the rotary mirror 24 is turned by each predetermined angle, to project the first slit light onto the object, thereby taking the image of the object by the CCD camera 4. Subsequently, the motor 33 is rotated through 90 degrees so that the slit light generator 32 is rotated and positioned in a second position, and a second slit light perpendicular to the first slit light is radiated, as shown in FIG. 14. The second slit light is projected onto the object in a similar manner, while the rotary mirror 24 is turned by each predetermined angle for scanning the object, thereby taking the image of the object are obtained by the CCD camera 4. In the third embodiment, a motor is used as a means for positioning the rotational position of the slit light generator 32, but since the slit light generator 32 need only be positioned in two rotational positions, a solenoid or air cylinder may be used in place of the motor, and the rotational position of the slit light generator 32 may be set by a means capable of converting linear motion into rotating motion such as a rack-and-pinion assembly.

An object position/orientation detecting process executed by the main processor of the image processing apparatus 1 in the third embodiment is substantially identical with the process of the first embodiment shown in the flow chart of FIGS. 7 and 8, except that the "vertical slit light" and "horizontal slit light" in the flow chart of FIGS. 7 and 8 should be read as the "first slit light" and "second slit light," respectively for application to the third embodiment. Further, Step S1 should be changed to "Stop the operation of the slit light generator 32 and obtain a background image."; Step S2 should be changed to "Position, by rotation, the slit light generator 32 in the first slit-light generating position, and shift the first slit light to the scanning start point"; and Step S10 should be changed to "Stop the operation of the slit light generator 32, and position the slit light generator 32 in the second slit-light generating position."

The second and third embodiments require only one light projector, and thus the overall apparatus can be simplified in structure as compared with the first embodiment. Particularly, since the principle of triangulation is employed, a certain distance is required between the CCD camera and the slit light generator. Thus, if two light projectors are used, an increase in the overall size of the apparatus is unavoidable, but according to the second and third embodiments using a single light projector, a small-sized, compact apparatus can be provided.

As described above, according to the present invention, two slit lights perpendicular to each other are projected onto an object for scanning the object with each slit light, and light-section information is obtained from the slit light image captured during each scanning, to thereby measure the position and orientation of the object. Accordingly, even in the case where the scanning intervals are rough, measurement of the position/orientation of the object is feasible, and also the quantity of the necessary position/orientation measurement data can be small, whereby the processing speed is increased and the three-dimensional position/orientation of the object can quickly be measured with high accuracy. Thus, the present invention can provide a practical measuring apparatus capable of carrying out high-accuracy measurement in a proper processing time that matches the acting time of an industrial robot.

We claim:

1. A method for measuring three-dimensional position and orientation of an object, comprising the steps of:

(a) projecting a first slit light oriented in a first direction onto an object and scanning the object in a direction different from the first direction;

(b) projecting a second slit light oriented in a second direction different from the first direction onto the object and scanning the object in a direction different from the second direction;

(c) obtaining edge information of the object by processing images of the projected first and second slit lights; and (d) determining the three-dimensional position and orientation of the object based upon the edge information and previously obtained shape information of the object.

2. The method according to claim 1, wherein said step (c) includes:

(c1) analyzing the slit light image obtained during each scanning of the object into a straight-line sequence of points which may include a disconnection or bend;

(c2) obtaining an endpoint and a bent point corresponding respectively to the disconnection and the bend of the straight-line sequence of points, based upon the point sequence information;

(c3) specifying, among the endpoints and bent points obtained with the slit lights oriented in the first direction, a group of endpoints and bent points that lie on an identical straight line, and specifying, among the endpoints and bent points obtained with the slit lights oriented in the second direction, a group of endpoints and bent points that lie on an identical straight line; and (c4) using a straight line comprised of the specified group of points as edge information of the object.

3. A method for measuring three-dimensional position and orientation of an object, comprising the steps of:

(a) projecting a first slit light oriented in a first direction onto an object and scanning the object in a direction different from the first direction;

(b) projecting a second slit light oriented in a second direction different from the first direction onto the object and scanning the object in a direction different from the second direction;

(c) obtaining edge information and plane information of the object by processing images of the first and second projected slit lights; and (d) determining the three-dimensional position and orientation of the object based upon the edge information, the plane information, and previously obtained shape information of the object.

4. The method according to claim 3, wherein, in obtaining the plane information of the object in said step (c), a part of the object is considered to form a plane when the projected slit light is straight and also parallel to the adjacent projected slit light.

5. An apparatus for measuring three-dimensional position and orientation of an object, comprising:

light projector means including projecting means for projecting a first slit light and a second slit light having a different direction from the first slit light, onto an object, and scanning means for successively shifting the first and second slit lights in different directions by a predetermined amount;

imaging means responsive to shifting of the slit lights in the respective directions caused by the scanning means, for obtaining a first multiple slit light image and a second multiple slit light image, respectively;

image processing means for extracting edge information of the object from the first and second multiple slit light images; and position/orientation calculating means for calculating the three-dimensional position and orientation of the object based upon the edge information and previously obtained shape information of the object.

6. The apparatus according to claim 5, wherein the light projecting means comprises first and second light projectors arranged in different positions with respect to the imaging means, the first light projector including projecting means for projecting the first slit light and scanning means for successively shifting the first slit light by a predetermined amount in a direction almost perpendicular to that of the first slit light, and the second light projector including projecting means for projecting the second slit light and scanning means for successively shifting the second slit light by a predetermined amount in a direction almost perpendicular to that of said first slit light.

7. The apparatus according to claim 6, wherein the scanning means for successively shifting the first and second slit lights by a predetermined amount comprises a rotary mirror.

8. The apparatus according to claim 6, wherein the imaging means comprises a solid-state imaging camera, the first light projector being positioned in a horizontal relation to the solid-state imaging camera and including projecting means for projecting the first slit light in a vertical direction with respect to a visual field of the solid-state imaging camera, and the second light projector being positioned in a vertical relation to the solid-state imaging camera and including projecting means for projecting the second slit light in a horizontal direction with respect to the visual field of the solid-state imaging camera.

9. The apparatus according to claim 8, wherein the scanning means for successively shifting the first and second slit lights by a predetermined amount comprises a rotary mirror.

10. The apparatus according to claim 7, wherein the projecting means of each of the first and second light projectors comprises a laser diode connected to a laser power supply, and a cylindrical lens.

11. The apparatus according to claim 10, wherein the scanning means for successively shifting the first and second slit lights by a predetermined amount comprises a rotary mirror.

12. The apparatus according to claim 5, wherein the light projecting means comprises a single light projector arranged in one spatial position and including projecting means for projecting the first and second slit lights and scanning means for successively shifting the first and second slit lights in different directions by a predetermined amount.

13. The apparatus according to claim 12, wherein the scanning means for successively shifting the first and second slit lights by a predetermined amount comprises a rotary mirror.

14. The apparatus according to claim 12, wherein the projecting means of the light projector for projecting the first and second slit lights comprises first and second slit light generating means connected to a laser power supply, and optical-axis adjusting means for aligning optical axes of the slit lights radiated from the first and second slit light generating means with each other, which is arranged between the scanning means for successively shifting the first and second slit lights in different directions by a predetermined amount and the first and second slit light generator means.

15. The apparatus according to claim 14, wherein the scanning means for successively shifting the first and second slit lights by a predetermined amount comprises a rotary mirror.

16. The apparatus according to claim 14, wherein the optical-axis adjusting means comprises a shield plate and a half-prism or a half-mirror.

17. The apparatus according to claim 16, wherein the scanning means for successively shifting the first and second slit lights by a predetermined amount comprises a rotary mirror.

18. The apparatus according to claim 12, wherein the light projector comprises slit light generating means for radiating a slit light of any desired direction, and slit-light projecting direction changing means for rotating the slit light generating means about an optical axis, the slit-light projecting direction changing means being operated to cause first or second slit light to be radiated from the slit light generating means.

19. The apparatus according to claim 18, wherein the scanning means for successively shifting the first and second slit lights by a predetermined amount comprises a rotary mirror.

20. The apparatus according claim 5, wherein the scanning means for successively shifting the first and second slit lights by a predetermined amount comprises a rotary mirror.

21. The apparatus according to claim 5, wherein the image processing means extracts edge and plane information of the object from the first and second multiple slit light images, and the position/orientation calculating means calculates the three-dimensional position and orientation of the object based upon the edge information, the previously obtained shape information and the plane information.

* * * * *

UNITED STATES PATENT AND TRADEMARK OFFICE
CERTIFICATE OF CORRECTION

PATENT NO. : 5,461,478
DATED : October 24, 1995
INVENTOR(S) : Sakakibara et al.

It is certified that error appears in the above-indentified patent and that said Letters Patent is hereby corrected as shown below:

Column 11, line 44, after "image" delete ".".

Signed and Sealed this

Thirteenth Day of February, 1996

Attest:

BRUCE LEHMAN

*Attesting Officer*  *Commissioner of Patents and Trademarks*